United States Patent [19]
Nachtrab et al.

[11] Patent Number: 5,901,338
[45] Date of Patent: May 4, 1999

[54] METHOD FOR PRODUCING URANIUM OXIDE AND SILICON TETRAFLUORIDE FROM URANIUM TETRAFLUORIDE, SILICON, AND A GASEOUS OXIDE

[75] Inventors: William T. Nachtrab, Maynard; John B. Bulko, Franklin, both of Mass.

[73] Assignee: Starmet Corporation, Concord, Mass.

[21] Appl. No.: 09/092,418

[22] Filed: Jun. 5, 1998

[51] Int. Cl.$^6$ .................. C01G 43/01; C01G 43/025; C01B 33/08
[52] U.S. Cl. ................... 423/260; 423/261; 423/341
[58] Field of Search .................... 423/341, 260, 423/261, 3

[56] References Cited

U.S. PATENT DOCUMENTS

| | | | |
|---|---|---|---|
| 3,518,060 | 6/1970 | Delange et al. | 423/261 |
| 3,941,870 | 3/1976 | Ekstrom et al. | 423/261 |
| 4,382,071 | 5/1983 | Otsuka et al. . | |
| 4,412,861 | 11/1983 | Kreuzmann . | |
| 4,470,959 | 9/1984 | Talwar et al. . | |
| 4,615,872 | 10/1986 | Porcham . | |
| 5,757,087 | 5/1998 | Carter et al. | 423/260 |

FOREIGN PATENT DOCUMENTS

| | | | |
|---|---|---|---|
| 888105 | 12/1971 | Canada | 423/260 |
| 3841 222 A1 | 6/1990 | Germany . | |
| 3841209 A1 | 6/1990 | Germany . | |
| 3841212 A1 | 6/1990 | Germany . | |
| 3841218 A1 | 6/1990 | Germany . | |
| 3841220 A1 | 6/1990 | Germany . | |
| 755692 | 8/1956 | United Kingdom | 423/341 |

OTHER PUBLICATIONS

Katz, Joseph J. and Rabinowitch, Eugene, "The Chemistry of Uranium", Part I, The Element, Its Binary and Related Compounds, 1951, p. 376, No Month.

Boissin, P. et al., "Tucson—WM98 Uranium Hexafluoride Industrial Defluorination", 1998, pp. 1–8, No Month.

*Primary Examiner*—Steven Bos
*Attorney, Agent, or Firm*—Iandiorio & Teska; Erik Fako

[57] ABSTRACT

A method for producing uranium oxide includes combining uranium tetrafluoride, silicon and a gaseous anhydrous oxidizing agent having a lower thermodynamic stability than any oxide of uranium produced; heating the combination below the vapor point of the uranium tetrafluoride to sufficiently react the uranium tetrafluoride, silicon and the oxidizing agent to produce uranium oxide and a non-radioactive fluorine compound; and removing the fluorine compound.

19 Claims, 4 Drawing Sheets

METHOD FOR PRODUCING URANIUM OXIDE AND SILICON TETRAFLUORIDE FROM URANIUM TETRAFLUORIDE, SILICON, AND A GASEOUS OXIDE

FIELD OF INVENTION

This invention relates to a method for producing uranium oxide and more particularly to a method for converting uranium tetrafluoride into uranium oxide and producing a non-radioactive fluorine compound which is free of contaminants.

BACKGROUND OF INVENTION

Uranium is a naturally occurring element which is comprised of approximately 0.7% $^{235}$U and 99.3% $^{238}$U. $^{235}$U is used to produce Nuclear Energy, while $^{238}$U is not. Because of the low percentage of $^{235}$U found in naturally occurring uranium, naturally occurring uranium must be enriched in order to obtain sufficient amounts of $^{235}$U to which will support nuclear fission. This enrichment process, aside from producing high concentrations of $^{235}$U, produces huge amounts of depleted uranium hexafluoride (UF$_6$) by-product which is a very hazardous compound posing a serious health threat since depleted uranium metal is radioactive and expensive to produce, it is used in limited quantities for highly specific applications. Accordingly, alternative uses are needed in order to avoid having to dispose of the UF$_6$ at great expense by storing it indefinitely. One solution to reducing the large stores of UF$_6$ is to convert the UF$_6$ into uranium oxide, e.g. UO$_2$ or U$_3$O$_8$.

One use for uranium oxide is to add it to the concrete which is used to build bunkers in which radioactive waste is stored in order to provide high density shielding for the stored high level radioactive waste. Uranium oxide possesses outstanding radioactive shielding properties, and when added to concrete in the form of aggregate makes a very effective low cost shielding material.

There are many methods which can be used to convert UF$_6$ into uranium oxide. Many of these methods also produce valuable by-products. However, methods which are currently used to convert the UF$_6$ into uranium oxide taint these valuable by-products with radioactive uranium, rendering the by-products commercially unusable, requiring additional processing to remove the radioactivity, as well as additional contaminants, or storing the by-products as low level radioactive waste.

The most common method for producing uranium oxide includes reacting UF$_6$ gas with steam (H$_2$O) and hydrogen (H$_2$). This produces uranium oxide and hydrogen fluoride gas (HF). However, because the products and reactants are mixed in the gas phase, this HF gas, although having economic value, is contaminated by unreacted uranium thus reducing its value as discussed above. Moreover, it is highly diluted, due to the steam, further reducing its value.

Another method for producing uranium oxide reacts UF$_6$ with H$_2$ to produce uranium tetrafluoride (UF$_4$) and HF gas. The UF$_4$ is then reacted with steam to produce a uranium oxide, UO$_2$ or U$_3$O$_8$, and HF gas. However, the reverse reaction is so strong that tremendous amounts of steam must be used to avoid a reverse reaction. This not only requires a large amount of energy to produce the steam, but again produces a highly diluted hydrogen fluoride product that has little commercial value, requiring further processing to obtain a valuable product. Moreover, complete conversion to uranium oxide is nearly impossible thereby degrading the uranium oxide's suitability for making concrete and thus the value of the uranium oxide produced.

Accordingly, the major drawbacks of the presently preferred methods are that the HF is diluted and contaminated with some amount of uranium making it commercially unusable. Thus, while HF has some economic value, the uranium contamination reduces this value and further provides yet another storage dilemma, as encountered with all radioactive waste, or additional processing to purify the HF.

Moreover, these methods are very expensive. Thus, an economical way to convert UF$_6$ to uranium oxide is needed in order to make use of the large quantities of radioactive waste such as UF$_6$ and produce commercially valuable by-products which are not radioactive and require no additional processing.

One solution to reducing the large stores of UF$_6$ is to reduce UF$_6$ to UF$_4$ and convert the UF$_4$ into SiF$_4$, and an oxide of uranium, e.g. UO$_2$ or U$_3$O$_8$.

Silicon tetrafluoride is widely used in the manufacturer of semi-conductor chips, pyrogenic silica, and other industrially important chemicals.

Silicon tetrafluoride can be produced in several ways all of which are based on reacting silica (SiO$_2$) with either hydrofluoric acid (HF) or fluorosilicic acid (H$_2$SiF$_6$). Thus to produce SiF$_4$ from SiO$_2$, the production of either hydrofluoric or fluorosilicic acid intermediate is required.

Current processes to produce SiF$_4$ in, varying degrees of purity, include the reaction of silica with hydrogen fluoride gas according to the reaction:

$$SiO_2(s) + 4HF(g) \rightarrow SiF_4(g) + 2H_2O$$

See U.S. Pat. No. 4,382,071.

Purity of the SiF$_4$ is dependent on the source of the silica and hydrogen fluoride reagents. The reaction is typically carried out at 25°–55° C. in concentrated sulfuric acid (>80% H$_2$SO$_4$) in order to diminish the reverse reaction through capture of the product H$_2$O. This process also uses large amounts of anhydrous HF which raises concerns for corrosion, safety and environmental management.

Production of SiF$_4$ from fluorosilicic acid can be accomplished according to the reaction:

$$SiO_2(s) + 2H_2SiF_6(aq) \rightarrow 3SiF_4(g) + 2H_2O$$

See U.S. Pat. No. 4,470,959. This reaction is also carried out in concentrated sulfuric acid (>80% H$_2$SO$_4$), but usually at a slightly higher temperature, between 25°–95° C.

It is also possible to produce SiF$_4$ directly from fluorosilicic acid by thermal decomposition:

$$H_2SiF_6(aq) \rightarrow SiF_4(g) + 2HF(g)$$

However, typical input fluorosilicic acid (20–30% aqueous) comes from fertilizer and phosphoric acid/super phosphate manufacturing waste tails. The fluorosilicic acid is generally low grade containing many impurities such as phosphorous, nitrogen and sulfur, all of which are detrimental to producing high purity SiF$_4$.

Yet, another multi-step process for producing SiF$_4$ utilizes the reaction of fluorosilicic acid with sodium fluoride and silicon dioxide according to the reaction:

$$2H_2SiF_6(aq) + 6NaF + SiO_2 \rightarrow 3Na_2SiF_6(s) + 2H_2O$$

followed by thermal treatment of the fluorosilicate salt at 600° C. to release SiF$_4$ according to the reaction:

$$Na_2SiF_6 \rightarrow SiF_4(g) + 2NaF$$

See U.S. Pat. No. 4,615,872.

As with the processes discussed above, this introduces impurities through use of low grade fluorosilicic acid diminishing the purity of the silicon tetrafluoride produced.

SUMMARY OF INVENTION

It is therefore an object of this invention to provide a method for producing uranium oxide from uranium tetrafluoride.

It is a further object of the present invention to provide such a method which produces uranium oxide without radioactive by-products.

It is a further object of the present invention to provide such a method which produces a fluorine compound which is free from radioactive contaminants.

It is a further object of the present invention to provide such a method which produces a fluorine compound which is undiluted with water.

It is a further object of the present invention to provide such a method which completely reacts the uranium tetrafluoride into uranium oxide.

It is a further object of the present invention to provide such a method which is cost effective to implement.

The invention results from the realization that a truly efficient and cost effective method for producing uranium oxide can be achieved by combining uranium tetrafluoride, silicon and a gaseous, anhydrous oxidizing agent, having a lower thermodynamic stability than any oxide of uranium produced, in stoichiometric proportion so that when the combination is heated to a temperature below the vapor point of the uranium tetrafluoride, the uranium tetrafluoride completely reacts with the silicon and gaseous anhydrous oxidizing agent to produce uranium oxide and an undiluted fluorine compound free from radioactive carryover and other contaminants.

This invention features a method for producing uranium oxide including combining uranium tetrafluoride, silicon and gaseous anhydrous oxidizing agent having a lower thermodynamic stability than the uranium oxide to be produced, heating the combination below the vapor point of the uranium tetrafluoride to sufficiently react the uranium tetrafluoride, silicon and the oxidizing agent to produce uranium oxide and non-radioactive fluorine compound, and removing the fluorine compound.

In a preferred embodiment, the uranium tetrafluoride and the silicon may be combined in stoichiometric proportion. The oxidizing agent may include a non-metal oxide that reacts with uranium tetrafluoride to produce a volatile fluorine compound. The oxidizing agent may include an oxide that reacts with the uranium tetrafluoride and silicon to produce a gaseous fluorine compound. Oxygen may be introduced to the reaction. Heating may include heating the combination in a temperature range of 400° C. to 750° C. The oxidizing agent may be selected from the group $O_2$, CO, $CO_2$, NO, $NO_2$, $SO_2$ and $SO_3$. The oxidizing agent may include an oxide of nitrogen or sulfur. The uranium oxide produced may be $UO_2$ or $U_3O_8$. The fluorine compound may include $SiF_4$. The uranium tetrafluoride may be powdered. The silicon may include silicon metal powder. Heating may include heating the combination below the melting point of uranium tetrafluoride.

This invention also features uranium oxide produced by combining uranium tetrafluoride, silicon and a gaseous anhydrous oxidizing agent having lower thermodynamic stability than any oxide of uranium to be produced, heating the combination below the vapor point of the uranium tetrafluoride to sufficiently react the uranium tetrafluoride, silicon and the oxidizing agent to produce uranium oxide and a non-radioactive fluorine compound, and removing the fluorine compound.

The invention also features a method for producing silicon tetrafluoride by combining uranium tetrafluoride, silicon and a gaseous, anhydrous oxidizing agent having lower thermodynamic stability than any oxide of uranium to be produced, heating the combination below the vapor point of the uranium tetrafluoride to sufficiently react the uranium tetrafluoride, silicon and the oxidizing agent to produce silicon tetrafluoride and an oxide of uranium, and removing the silicon tetrafluoride.

In a preferred embodiment combining may include combining the uranium tetrafluoride and the silicon in stoichiometric proportion. Oxygen may be added to the reaction.

The invention also features silicon tetrafluoride produced by combining uranium tetrafluoride, silicon and a gaseous, anhydrous oxidizing agent having lower thermodynamic stability than any oxide of uranium to be produced, heating the combination below the vapor point of the uranium tetrafluoride to sufficiently react the uranium tetrafluoride, silicon and the oxidizing agent to produce silicon tetrafluoride and an oxide of uranium, and removing the silicon tetrafluoride.

DISCLOSURE OF PREFERRED EMBODIMENT

Other objects, features and advantages will occur to those skilled in the art from the following description of a preferred embodiment and the accompanying drawings, in which.

Figure 1:
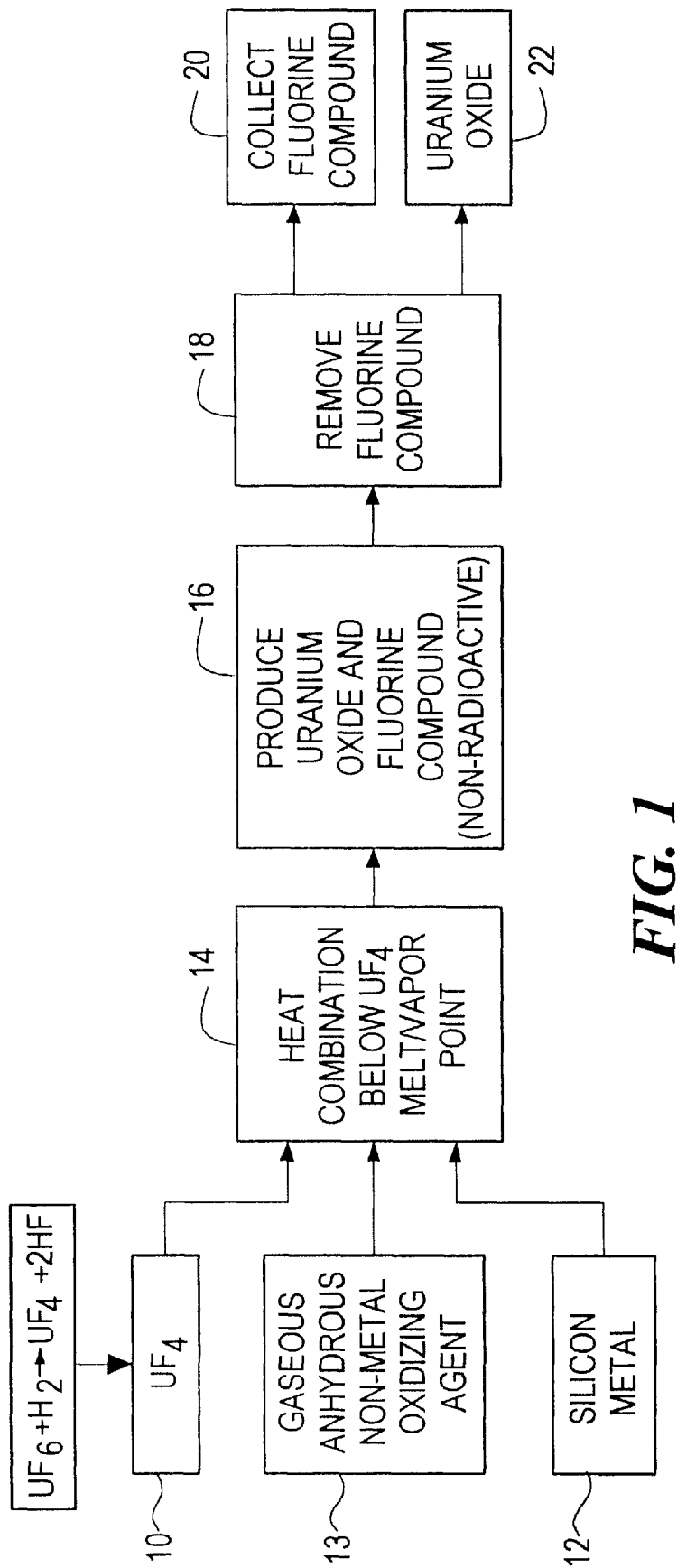
FIG. 1 is a block diagram of the method for producing uranium oxide according to the present invention.

Uranium hexafluoride ($UF_6$) gas is reacted with hydrogen ($H_2$) to produce uranium tetrafluoride ($UF_4$) 10, FIG. 1. The $UF_4$ 10 is combined with silicon metal 12 and a gaseous anhydrous non-metal oxidizing agent 13, and the combination is heated 14 below the melting point of $UF_4$ 10 to produce uranium oxide and an undiluted fluorine compound 16 without uranium carryover. The non-radioactive fluorine compound is removed 18 and collected 20, leaving only the completely reacted uranium oxide 22.

Figure 2:
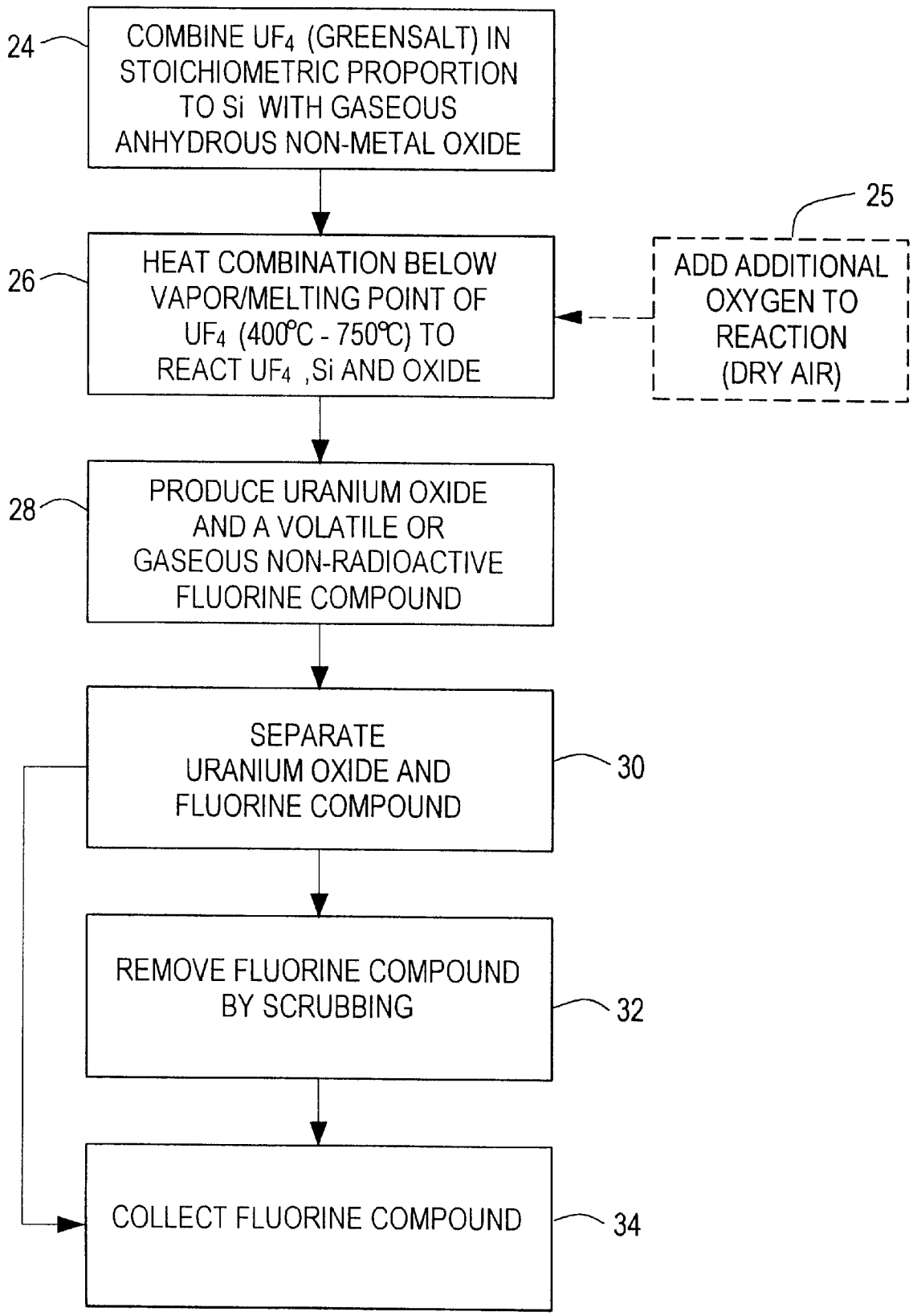
FIG. 2 is a flow chart of the method for producing uranium oxide according to the present invention.

The $UF_4$, or green salt, which may be granular, is combined in stoichiometric proportion with silicon metal, which may be granular or finely divided powder, block 24, FIG. 2. This ensures that the $UF_4$ is completely reacted. The silicon metal may, however, be mixed in slight excess of its stoichiometric proportion. The oxidizing agent is chosen such that it has a lower thermodynamic stability than any oxide of uranium, $UO_2$ or $U_3O_8$, which may be produced by the reaction. This is done so that when the combination is heated to sufficiently react the silicon and oxidizing agent with the $UF_4$, block 26, the anhydrous non-metal oxide readily gives up its oxygen and an oxide of uranium and a volatile, or gaseous, fluorine compounds are produced, block 28. In some instances, oxygen may be added, for example as dry air, block 25, shown in phantom, in order to obtain a desired oxide of uranium. Using an anhydrous oxide ensures that the fluorine compound produced is not diluted with water as with current methods.

However, the combination is heated, block 26, only to a temperature below the vapor point, or at least the melting point of $UF_4$ or silicon, typically within a temperature range from 400° C. to 750° C. Heating the combination below the vapor or melting point of the uranium tetrafluoride prevents vaporization of the uranium, ensuring that the uranium does not enter the gaseous phase and thus contaminate the fluorine product with radioactive uranium.

Moreover, heating the stoichiometric combination below the melting point of $UF_4$ ensures that the $UF_4$ completely reacts with the oxidizing agent, because no unreacted uranium is lost to the fluorine compound. Producing a volatile or gaseous fluorine compound allows the oxide of uranium produced and the fluorine compound to be easily separated, block 30, so that the nonradioactive fluorine compound may be removed, block 36.

Once the fluorine compound has been removed, block 32, for example by scrubbing the fluorine compound using an adsorbent bed or combining the fluorine compound with a reactive agent to trap and separate out the fluorine compound, the fluorine compound can be collected, block 34. This is not necessary limitation of the invention, as the fluorine compound may be directly collected, the gas being analyzed to verify the presence of the desired fluorine compound. The fluorine compound can be recovered from the adsorbent bed material or the trap residue through heat decomposition well known in the art.

Thus, by heating $UF_4$ below its vapor point ensures not only that the fluorine compound produced is not contaminated by unreacted uranium, but that all the uranium tetrafluoride is in fact reacted due to the stoichiometric proportions in which the combination was mixed and the lack of uranium carryover, producing a valuable oxide of uranium.

Choosing a gaseous anhydrous non-metal oxidizing agent having a lower thermodynamic stability than any oxide of uranium that may be produced further ensures the uranium tetrafluoride is completely reacted.

For example, $UO_2$ has an enthalpy of formation of 259.0 kcal/mole, as shown in Table 1.

TABLE 1

| OXIDE | ENTHALPY OF FORMATION ($-\Delta H_f°298$) kcal/mole |
|---|---|
| $U_3O_8$ | 854.1 |
| $UO_2$ | 259.0 |
| CO | 26.4 |

When the oxidizing agent is carbon monoxide (CO), having an enthalpy of formation of 26.4 kcal/mole, the CO readily gives up its oxygen which is readily accepted by the uranium to produce $UO_2$ and $SiF_4$ according to the reaction:

$$UF_4(s) + 2CO(g) + Si \rightarrow UO_2(s) + SiF_4 + 2C$$

The use of $UF_4$ as the fluorine source for production of silicon tetrafluoride eliminates the problems of impurities introduced by the use of fluorosilicic acid, and the expense and safety hazards associated with handling HF. $UF_4$ is a relatively inert solid that is easy to handle with proper precaution for containment of low level radioactive materials. $UF_4$ is also produced in very high purity being derived from the highly refined $UF_6$. Thus, the uses of $UF_4$ has both technical and economic advantages in the production of high purity $SiF_4$.

Other gaseous anhydrous non-metal oxides that may be used include oxides of carbon, nitrogen and sulfur as well as oxygen as shown in Table 2.

TABLE 2

| GASEOUS OXIDE | ENTHALPY OF FORMATION ($-\Delta H_f°298$) | FLUORINE COMPOUND |
|---|---|---|
| $O_2$ | 0 | $SiF_4$ |
| CO | 24.6 | $SiF_4$ |
| $CO_2$ | 94.0 | $SiF_4$ |
| NO | -21.6 | $SiF_4$ |
| $NO_2$ | -8.0 | $SiF_4$ |
| $SO_2$ | 71.0 | $SiF_4$ |
| $SO_3$ | 94.4 | $SiF_4$ |

Examples of the reactions which produce the above compounds are as follows:

$$UF_4 + Si + O_2 \rightarrow UO_2 + SiF_4 \qquad (1)$$

$$UF_4 + Si + 2CO \rightarrow UO_2 + SiF_4 + 2C \qquad (2)$$

$$3UF_4 + 3Si + 6CO + O_2 \rightarrow U_3O_8 + 3SiF_4 + 6C \qquad (3)$$

$$UF_4 + Si + CO_2 \rightarrow UO_2 + SiF_4 + C \qquad (4)$$

$$UF_4 + Si + 2CO_2 \rightarrow UO_2 + SiF_4 + 2CO \qquad (5)$$

$$3UF_4 + 3Si + 6CO_2 + O_2 \rightarrow U_3O_8 + 3SiF_4 + 6CO \qquad (6)$$

$$UF_4 + Si + 2NO \rightarrow UO_2 + SiF_4 + N_2 \qquad (7)$$

$$3UF_4 + 3Si + 6NO + O_2 \rightarrow U_3O_8 + 3SiF_4 + 3N_2 \qquad (8)$$

$$2UF_4 + 2Si + 2NO_2 \rightarrow 2UO_2 + 2SiF_4 + N_2 \qquad (9)$$

$$3UF_4 + 3Si + 4NO_2 \rightarrow U_3O_8 + 3SiF_4 + 2N_2 \qquad (10)$$

$$UF_4 + Si + SO_2 \rightarrow UO_2 + SiF_4 + S \qquad (11)$$

$$3UF_4 + 3Si + 3SO_2 + O_2 \rightarrow U_3O_8 + 3SiF_4 + 3S \qquad (12)$$

$$3UF_4 + 3Si + 2SO_3 \rightarrow 3UO_2 + 3SiF_4 + 2S \qquad (13)$$

$$9UF_4 + 9Si + 8SO_3 \rightarrow 3U_3O_8 + 9SiF_4 + 8S \qquad (14)$$

These are not necessary limitations to the invention as other oxides of nitrogen or sulfur may be used. Moreover, depending on the gaseous non-metal oxide chosen, additional oxygen ($O_2$) may be introduced to the reaction in order to obtain the desired oxide of uranium, $UO_2$ or $U_3O_8$. The anhydrous gaseous oxide may be diluted in an inert carrier gas such as nitrogen or argon to control the rate of reaction.

EXAMPLE 1

Figure 3:
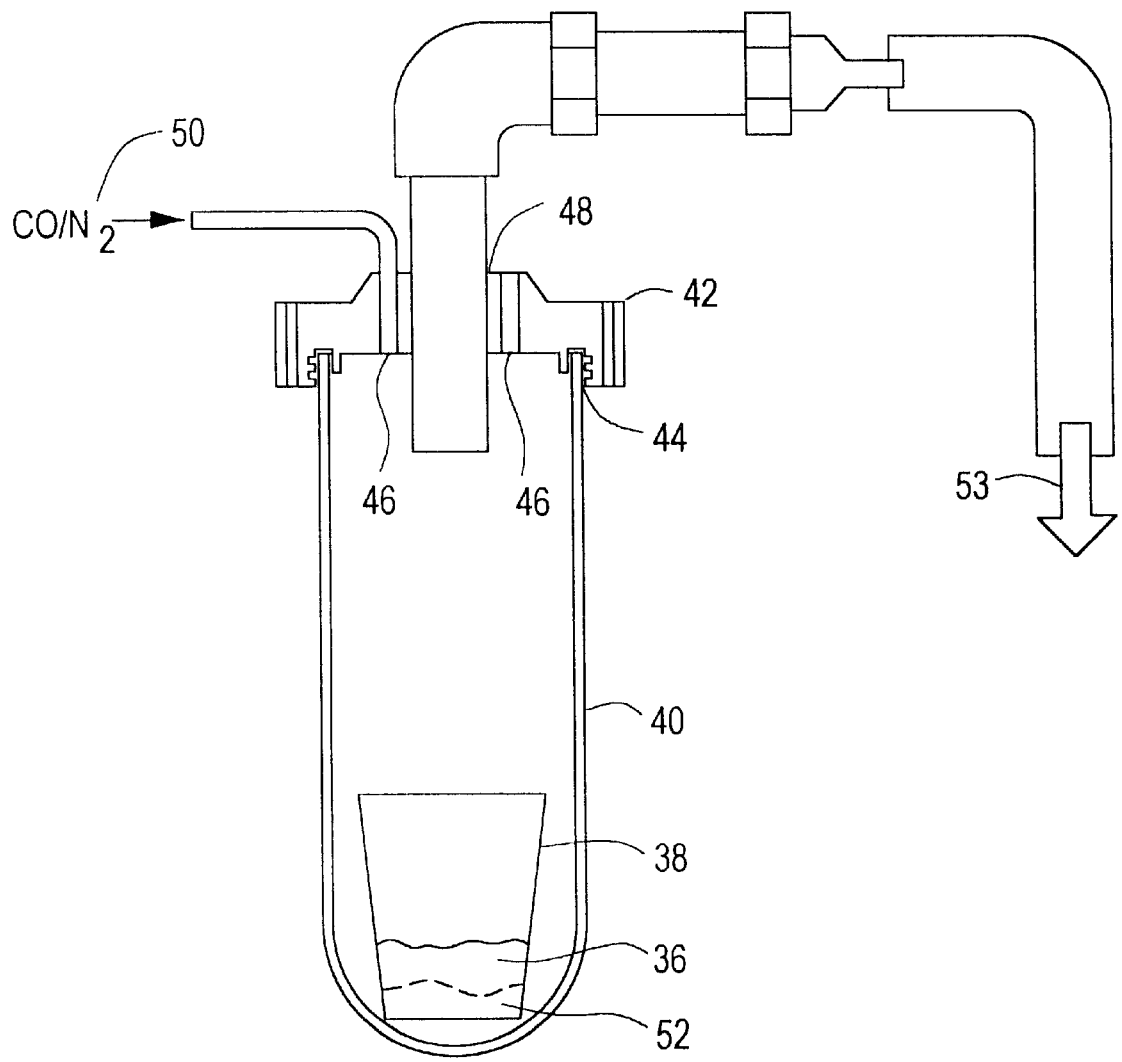
FIG. 3 is a schematic diagram of the apparatus used to produce the uranium oxide and fluorine product according to the present invention.

An amount of 6.240 grams of uranium tetrafluoride was combined with 0.604 grams of silicon (Si) metal powder in a vial and capped. The combination was vigorously shaken for several hours, to thoroughly mix the combination, on a ball mill. The combination 36, FIG. 3, was transferred to a high density, non-porous, alumina (99.8%) ceramic crucible 38. The crucible was then placed at the bottom of larger vessel 40, made of the same material and sealed with corrosion resistant monel metal cap 42 and ultra high temperature RTV silicon gasket compound 44. Cap 42 has inlet ports 46 and outlet port 48 for allowing the gas to flow through vessel 40.

Sealed vessel 40 was placed in a crucible furnace, not shown. One of inlet ports 46 was capped and the other was used to introduce 10% CO in nitrogen ($N_2$), $CO/N_2$ to the combination at 200–250 cc/min. This flow was maintained throughout the reaction. Vessel 40 was heated to 600° C. in 3°/min. increments and maintained for three hours thereafter. Vessel 40 was cooled to ambient temperature in 3°/min. increments and crucible 38 removed from vessel 40. Post reaction residue 52, shown in phantom, which was brown in color, flowed easily from crucible 38. Conversion of $UF_4$ to $UO_2$ was essentially complete, nearly 100% yield as determined by percent dissolution in nitric acid.

Uranium oxides, namely $UO_2$ and $U_3O_8$, are very soluble in concentrated nitric acid while $UF_4$ is relatively inert and is slow and difficult to dissolve. This behavior can be used to test for the presence of unreacted $UF_4$ in the residue of the reactor chamber. One gram of residue is added to 5 ml of concentrated nitric acid followed by the addition of 3 ml of distilled $H_2O$. The resultant mixture is then thoroughly stirred for twenty minutes after which the solution is filtered to separate any undissolved solids. The filtered solids are then washed thoroughly with $H_2O$, dried and weighed. The percent of unreacted $UF_4$ is calculated from:

% Unreacted $UF_4$=(weight of filter residue/one gram of initial solid residue)×100.

The overall reaction yield is given by:

Yield=100 - % Unreacted $UF_4$

Figure 4:
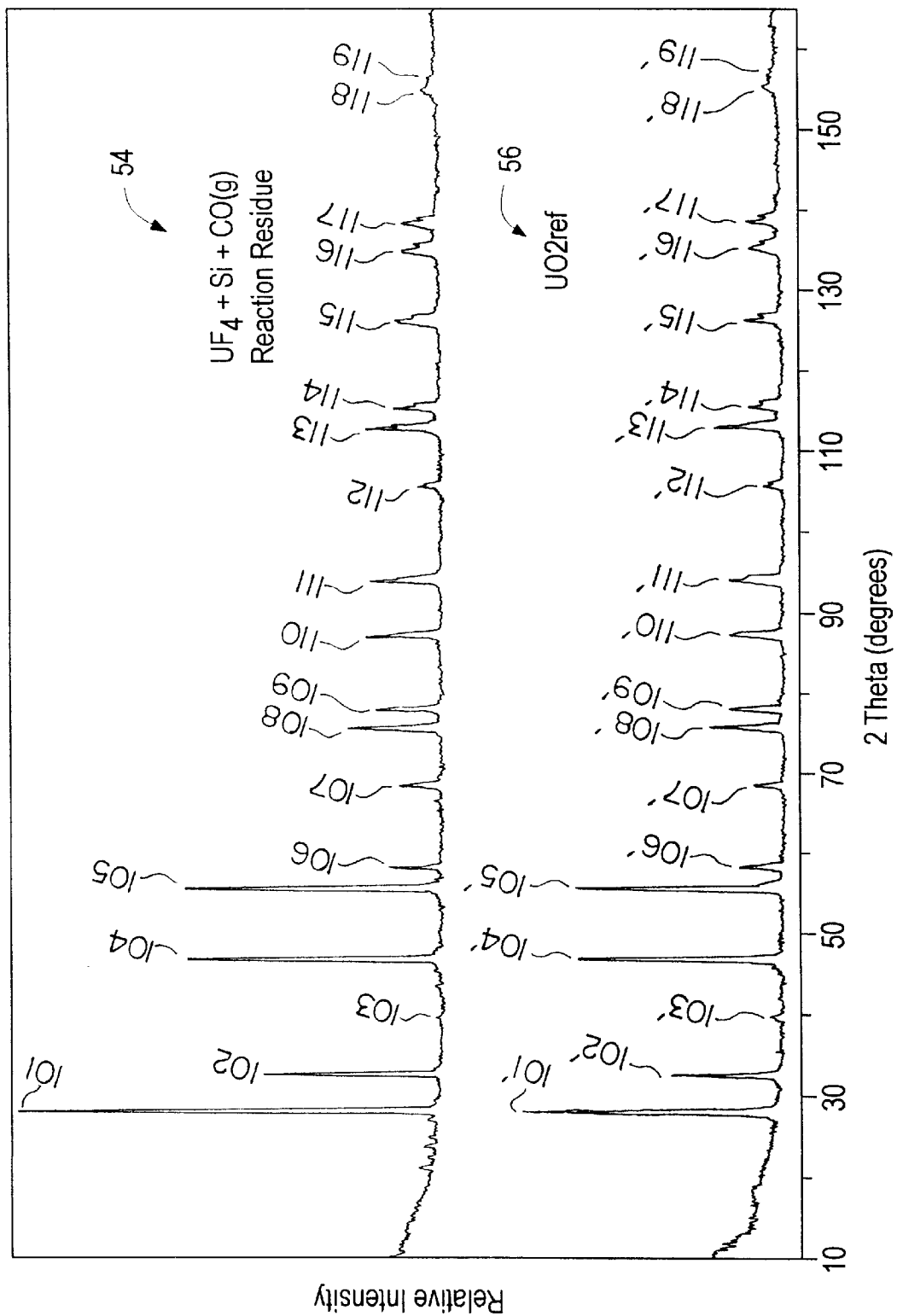
FIG. 4 is a representation of an x-ray diffraction analysis performed on the uranium oxide produced according to the method of the present invention compared to a standard x-ray diffraction pattern for uranium oxide.

Verification of complete reaction of the products to produce oxides of uranium was achieved using x-ray powder diffraction analysis on post reaction residue 52. X-ray diffraction pattern 54, FIG. 4, of the product residue was compared to a standard x-ray diffraction reference patterns 56 for $UO_2$. The correlation of peaks 101–119 of reaction residue pattern 54 with peaks 101'–119' of $UO_2$ reference pattern 56 indicates the presence of $UO_2$ in the post reaction residue. The absence of non-correlating peaks also confirms the absence of unreacted uranium.

Verification that silicon tetrafluoride was produced was accomplished by observing gas 53 in the form of a white plume which is characteristic of the reaction of silicon tetrafluoride with moisture to form silica and hydrogen fluoride.

Thus, the method according to the present invention not only reacts all of the uranium, but produces a fluorine compound, such as silicon tetrafluoride, of very high purity by heating the stoichiometric combination below the vapor or melting point of the uranium tetrafluoride. The uranium tetrafluoride completely reacts to produce uranium oxide without radioactive carryover into the fluorine compound by-product producing a commercially valuable product without requiring additional processing or low level radioactive storage. Converting uranium oxide from uranium tetrafluoride, rather than directly from uranium hexafluoride, produces less radioactive and diluted HF.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A method for producing uranium oxide comprising:

combining uranium tetrafluoride, silicon and a gaseous anhydrous oxidizing agent;

heating the combination below the vapor point of the uranium tetrafluoride to sufficiently react the uranium tetrafluoride, silicon and the oxidizing agent to produce uranium oxide and a non-radioactive fluorine compound, the oxidizing agent having a lower thermodynamic stability than the oxide of uranium; and removing the fluorine compound.

2. The method of claim 1 in which combining includes combining the uranium tetrafluoride and the silicon in stoichiometric proportion.

3. The method of claim 2 in which the oxidizing agent includes an oxide that reacts with the uranium tetrafluoride and silicon to produce a volatile fluorine compound.

4. The method of claim 2 in which the oxidizing agent includes an oxide that reacts with uranium tetrafluoride and silicon to produce a gaseous fluorine compound.

5. The method of claim 1 in which heating further includes introducing oxygen to the reaction.

6. The method of claim 1 in which heating includes heating the combination in the temperature range of 400° C. to 750° C.

7. The method of claim 6 in which the oxidizing agent is selected from the group consisting of $O_2$, CO, $CO_2$, NO, $NO_2$, $SO_2$, and $SO_3$.

8. The method of claim 6 in which the oxidizing agent includes an oxide of nitrogen.

9. The method of claim 6 in which the oxidizing agent includes an oxide of sulfur.

10. The method of claim 7 in which the uranium oxide produced includes $U_3O_8$.

11. The method of claim 7 in which the uranium oxide produced includes $UO_2$.

12. The method of claim 10 in which the fluorine compound includes $SiF_4$.

13. The method of claim 11 in which the fluorine compound includes $SiF_4$.

14. The method of claim 1 in which the uranium tetrafluoride includes powdered uranium tetrafluoride.

15. The method of claim 1 in which the silicon includes silicon metal powder.

16. The method of claim 1 in which heating further includes heating the combination below the melting point of the uranium tetrafluoride.

17. A method for producing silicon tetrafluoride comprising:

combining uranium tetrafluoride, silicon and a gaseous, anhydrous oxidizing agent;

heating the combination below the vapor point of the uranium tetrafluoride to sufficiently react the uranium tetrafluoride, silicon and the oxidizing agent to produce silicon tetrafluoride and an oxide of uranium, the oxidizing agent having a lower thermodynamic stability than the oxide of uranium; and removing the silicon tetrafluoride.

18. The method of claim 17 in which combining includes combining the uranium tetrafluoride and the silicon in stoichiometric proportion.

19. The method of claim 17 further including introducing oxygen to the reaction.

\* \* \* \* \*